United States Patent [19]
Witek

[11] Patent Number: 6,061,774
[45] Date of Patent: May 9, 2000

[54] LIMITED VIRTUAL ADDRESS ALIASING AND FAST CONTEXT SWITCHING WITH MULTI-SET VIRTUAL CACHE WITHOUT BACKMAPS

[75] Inventor: Richard Thomas Witek, Austin, Tex.

[73] Assignee: Compaq Computer Corporation, Houston, Tex.

[21] Appl. No.: 08/863,084

[22] Filed: May 23, 1997

[51] Int. Cl.[7] .............................. G06F 12/00; G06F 12/08
[52] U.S. Cl. ........................ 711/210; 711/203; 711/202; 711/6
[58] Field of Search ................................ 711/203, 210, 711/202, 6; 395/677, 678, 406

[56] References Cited

U.S. PATENT DOCUMENTS

| | | | |
|---|---|---|---|
| 4,400,770 | 8/1983 | Chan et al. ............................... | 364/568 |
| 4,488,256 | 12/1984 | Zolnowsky et al. ..................... | 364/900 |
| 5,119,290 | 6/1992 | Loo et al. ................................ | 395/400 |
| 5,287,508 | 2/1994 | Hejna, Jr. et al. ....................... | 395/650 |
| 5,680,577 | 10/1997 | Aden et al. .............................. | 395/477 |
| 5,787,474 | 7/1998 | Pflum ...................................... | 711/138 |
| 5,802,567 | 9/1998 | Liu et al. ................................. | 711/133 |
| 5,826,057 | 10/1998 | Okamoto et al. ........................ | 395/500 |

*Primary Examiner*—Eddie P. Chan
*Assistant Examiner*—Kimberly McLean
*Attorney, Agent, or Firm*—Hamilton, Brook, Smith & Reynolds, P.C.

[57] ABSTRACT

Apparatus for supporting virtual address aliasing is disclosed in which addresses to a virtual cache are first intercepted. It is determined whether the these addresses are aliased, i.e., more than one virtual address exists for the same location in memory. If not aliased, the addresses are simply passed to the virtual cache. In the case where there is aliasing, however, dealiasing is performed. New addresses are generated and passed to the virtual cache so that the aliased addresses are directed to the same locations in the virtual cache. In this way, an operating system can be supported that uses virtual address aliasing since the CPU can transparently issue aliased virtual addresses. These addresses, however, are directed to the same locations in the virtual cache so that the addresses are not aliased from the perspective of the cache, thus avoiding the need for other hardware to compensate for the aliasing. The modification, however, does not substantially impact latency. The invention is most useful in situations in which the operating system merely requires the potential for aliasing between active processes.

15 Claims, 2 Drawing Sheets

LIMITED VIRTUAL ADDRESS ALIASING AND FAST CONTEXT SWITCHING WITH MULTI-SET VIRTUAL CACHE WITHOUT BACKMAPS

BACKGROUND OF THE INVENTION

Virtual addressing to data/instruction caches has advantages relative to physical addressing techniques. Software using virtual addresses obtains advantages associated with relocation, which is especially useful in multiprocessing environments. Moreover, programs can be executed that require memory larger than the physical memory present in the machine by caching data/instructions on a larger data store, such as a hard drive.

Typically, however, hardware extracts a latency penalty to support virtual addressing. A virtual address generated by software and issued from a central processing unit (CPU) or input/output (I/O) device must first be passed to a memory management unit (MMU) that converts the virtual address to a physical address using a translation buffer. This physical address is then passed to the physically addressed cache. The serial nature of these operations, i.e., virtual-to-physical address translation followed by physical addressing, increases the time before information can be received back from the cache or the determination of a cache-miss, in which the desired information is not present in the cache.

Virtual caches or caches that support virtual addressing have been developed to remove the hardware latency commonly associated with virtual addressing. Virtual addresses from the CPU are passed to the MMU and the virtual cache in parallel. The MMU provides authorization/access control information for the cache addressing and the physical address, and the virtual cache returns the addressed information, or alternatively a cache-miss. In the cache-miss situation, the MMU's physical address is used.

A common issue that arises with virtual caches is aliasing, i.e., the mapping of multiple virtual addresses to the same physical address in memory. This can lead to problems in write-back data caches where software updates data in the cache so that the only place where the data is valid is in the cache until it is returned back to main memory. The existence of aliased virtual addresses in the virtual cache leads to portions of the virtual cache that are incoherent with respect to each other. When the data is returned, main memory may include only part of the changes originally made by the CPU to the cache.

Hardware confronts the issue of virtual address aliasing one of two ways. Either it is supported with additional hardware or simply outlawed, i.e., not supported, which limits its software compatibility.

The hardware support for virtual address aliasing usually takes the form of back-maps. This is a tag store that is in parallel with the cache. The back-map indicates on cache-misses whether the accessed block already exists in the cache, but under an aliased address. Backmaps have the advantage of being out of the critical path as they are only consulted on cache-misses. Thus, they do not increase latency. The drawback, however, is the additional tag store that must be present for every cache location. Consequently, many hardware systems do not provide back-maps for virtual address aliasing.

SUMMARY OF THE INVENTION

The present invention is directed to a hardware modification to the cache address path at a process slot granularity. Virtual address aliasing at this scale is common in multi-processing operating systems. The invention provides hardware support for multiple aliased addressed, i.e., supports multiple virtual addresses to the same physical address location in address-space, from the perspective of the CPU. The modification, however, does not substantially impact latency. The invention is most useful in situations in which the operating system merely requires the potential for aliasing between active processes. More particularly, the present invention provides support for multiple virtual addresses to the same physical address in systems that require only the current process to exist in two virtual-address locations.

In general according to one aspect, the invention features a method for supporting virtual address aliasing. Addresses to a virtual cache and/or memory management unit are first intercepted, and it is determined whether the addresses are aliased, i.e., more than one virtual address may exist for the same location in memory. If not aliased, the addresses are simply passed to the virtual cache and/or memory management unit. In the case where there is aliasing, however, dealiasing is performed. New addresses are generated and passed to the virtual cache and/or memory management unit so that the aliased addresses are directed to the same locations in the virtual cache. In this way, an operating system can be supported that uses virtual address aliasing since the CPU can transparently issue aliased virtual addresses. These addresses, however, are directed to the same locations in the virtual cache so that the addresses are not aliased from the perspective of the cache, thus avoiding the need for other hardware to compensate for the address space aliasing.

In the preferred embodiment the addresses are passed to both the virtual cache and memory management unit together. It is recognized, however, that in other situations it may be desirable to implement the inventive dealiaser on the path to either the cache or memory management unit individually.

In other embodiments, the virtual cache is divided into process slots corresponding to separate active processes, with address aliasing existing between a current process slot and one of the active process slots. Addresses to the current process slot are redirected to access the aliased active process slot. This is accomplished by detecting addresses to the current process slot and modifying them to access the aliased active process slot. In some embodiments, only the high order bits of the addresses need to be changed.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the following drawings, like reference characters refer to the same parts throughout the different views. The drawings are not necessarily to scale, emphasis instead being placed upon illustrating the principals of the invention.

DETAILED DESCRIPTION OF THE PREFERRED EMBODIMENTS

Some operating systems, Windows™ CE being a notable example, use virtual address aliasing in process management. In the context of the specific example of Windows™ CE, the operating system divides the lower two GigaBytes (GB) of virtual address space into 64 slots 0.63. Another two GB is system space. The most significant virtual address (VA) bit selects between user and system space, the bit being cleared (VA<31>==0) for user space.

Figure 1:
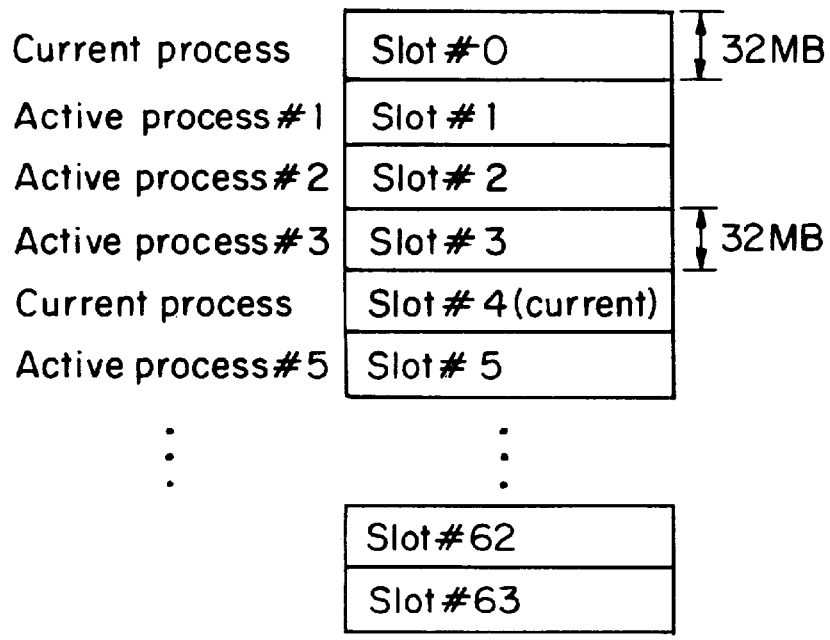
FIG. 1 is an virtual address map for an operating system requiring process-slot scale virtual address aliasing.

The first slot in user space, i.e., slot 0, designated by virtual addresses in which the most significant seven bits equal zero (VA<31:25>==0), is for the currently running process. Slots 1 through 63 (VA<31:25>==1 . . . 63) hold the 63 active processes supported by the system. Each of the processes is limited to 32 MegaBytes (MB). This configuration is illustrated in FIG. 1.

This construct is helpful because it facilitates inter-process communication. The processes address each other simply by building the address as follows:

$$VA = procNum * 2^{25} + addressInProc$$

in which ProcNum=1 . . . 63 i.e., one of the other active processes, and addressInProc=0 . . . 1×1FFFFFF.

Virtual address aliasing occurs because the current process, or the active process that is running the CPU, is mapped in virtual address space both to its slot, i.e., one of 1 . . . 63 and additionally to slot 0. In the example of FIG. 1, the process in slot #4 is the current process and thus is also found in slot #0. Such operating systems do not require virtual address aliasing at the page level, which could require backmapping hardware. Instead, the virtual address aliasing occurs between the supported applications, or at the process-slot scale.

Figure 2:
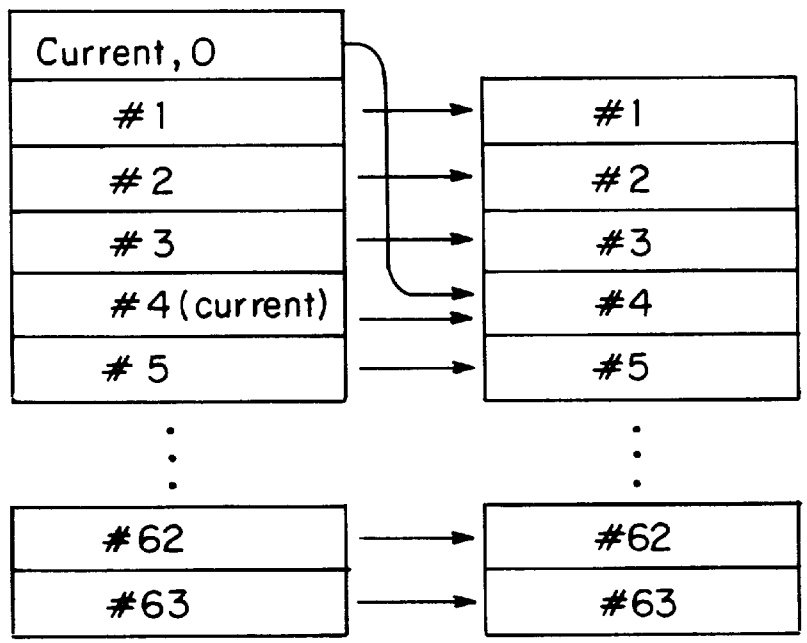
FIG. 2 is an address map illustrating the virtual address translation performed by the present invention to support limited aliasing.

The present invention relates to a virtual address dealiaser, the effect of which is illustrated in FIG. 2. Virtual addresses to any one of the active processes in slots 1 . . . 63 processes pass unchanged through to the virtual cache. Any addresses to the current process in slot 0, however, are redirected, in hardware, to the current one of the processes in slots 1 through 63, i.e., the process in slot #4 in the illustrated example.

In effect, the following fix-up is made to both the data and instruction address paths:

```
       if (va<31:25> == 0) {
           va' = va OR CPR * 2²⁵ ;
       } else {
           va' = va;
       }
with
       va = the address from the CPU;
       va' = the virtual address sent to the virtual
       cache and MMU from the virtual address dealiaser;
       and
       CPR is an added register that holds the number
       (1 . . . 63) of the current process.
```

Figure 3:
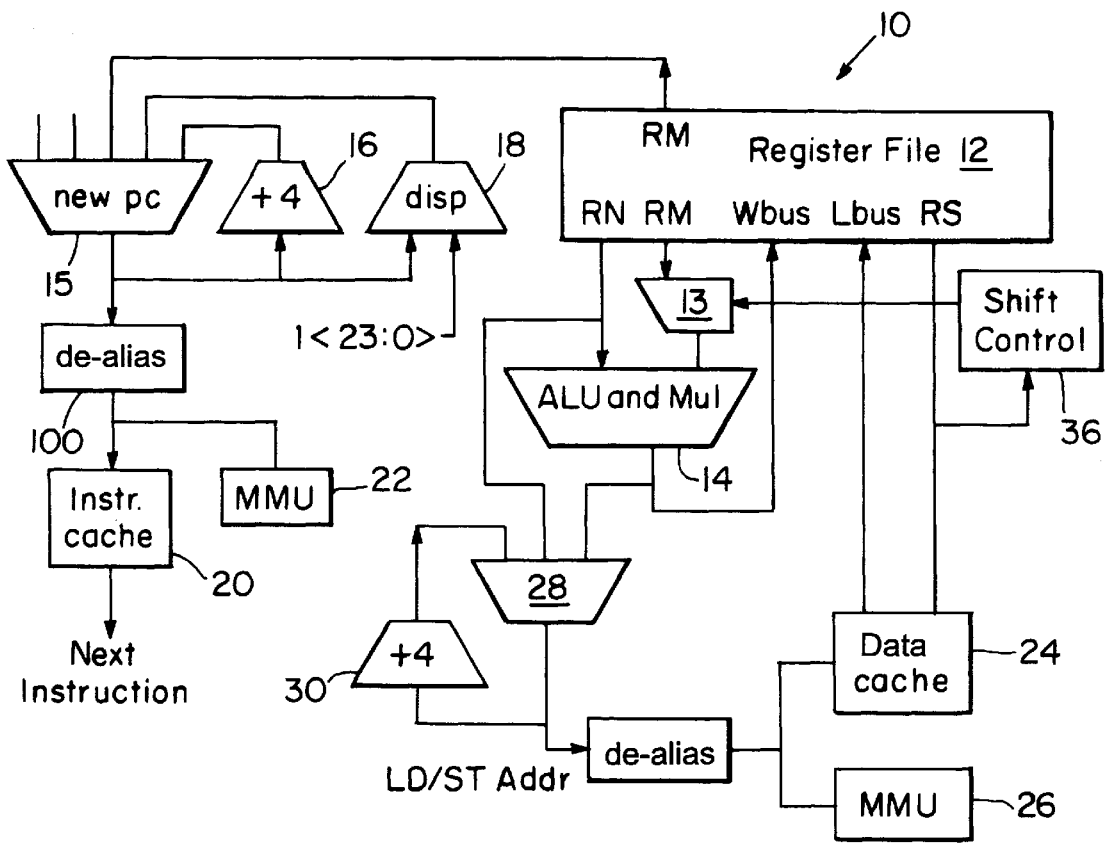
FIG. 3 is a block diagram illustrating the internal architecture of microprocessor and the relationship of the inventive dealiaser.

FIG. 3 illustrates the organization of a microprocessor 10 utilizing the present invention. In the preferred embodiment, the processor is a StrongARM 1100-type processor. Generally, a register file 12 feeds data to an arithmetic logic unit (ALU) and multiplier (Mul) 14 via read ports RN and RM. A shifter 13 is positioned on the read port RM and is controlled by shift controller 36 and register file port RS. Read port RM may also be selected as the source for a new program counter by a pc multiplexer 15. Other program counter sources are shown. An add-four incrementer 16 may be used or a displacement multiplexor 18, which shifts the output from a leg of the ALU 14 or previous pc for branch instructions.

Instructions from the pc multiplexer 15 are passed to the inventive virtual address dealiaser 100 prior to the instruction cache 20 and instruction memory management unit 22 to remove aliasing from the perspective of these components. As a result, the virtual cache 20 or translation buffer in the MMU 22 will not have aliased addresses and thus will not need the appropriate hardware to support aliasing.

On the data side, the source of the load/store address LD/ST to the data virtual cache 24 and the data MMU 26 is LD/ST multiplexer 28. This selects from three inputs, read port RN from the register file 12, the output from the ALU 14, or address incrementor 30 that selects the next 32 bit address in the byte addressed cache 24. The addressed data from the virtual cache is passed to the load bus Lbus of the register file 12.

A second, data dealiaser 100 is positioned to intercept addresses to the virtual data cache 24 and data MMU 26 to dealias the data addresses.

Figure 4:
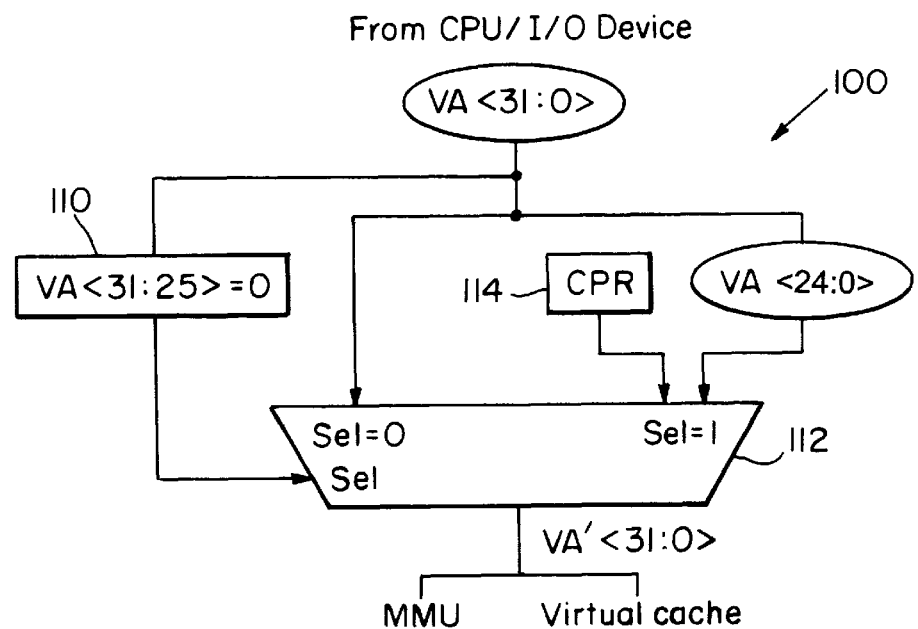
FIG. 4 is one hardware implementation of the present invention.

FIG. 4 shows one hardware implementation of the dealiaser 100 for either or both of the instruction or data virtual caches and MMU's. The 32 bit virtual address VA<31:0> is received at the dealiaser 100 from the ALU or other source. The value of the upper 7 bits of the virtual address is compared to 0 in logic 110, which could be implemented as a seven input NOR gate, for example. The output of the logic 110 is used as a select bit for multiplexor 112. If the virtual address VA is not to the current process in slot 0, then the virtual address passes unchanged through the dealiaser as VA' to both the MMU and the virtual cache, since the multiplexor 112 passes the VA at its sel=0 input. However, if the address is for the current process in slot 0, only the lower 25 bits of the virtual address pass through the multiplexor 112 of the dealiaser 100. The upper 7 bits, are changed to the slot address of the current process among the 1 . . . 63 active process slots. The value of these 7 bits is held in the current process register (CPR) 114. This causes the virtual cache to see all references to addresses in the range 0. . . 0×1FFFFFF to look like references to CPR*$2^{25}$+0 . . . +0×1FFFFFF. This fixup allows the CPU to function under the assumption that the current process also resides in slot #0 while avoiding virtual aliasing from the perspective of the virtual caches. In this way, the present invention supports limited virtual address aliasing, without the addition of a backmap or the need to flush the caches on each context switch.

While this invention has been particularly shown and described with references to preferred embodiments thereof, it will be understood by those skilled in the art that various changes in form and detail may be made therein without departing from the spirit and scope of the invention as defined by the appended claims.

What is claimed is:

1. A method for supporting limited virtual address aliasing in a system in which virtual addresses for one of a plurality of active process slots running on an operating system are aliased to a current process slot, the method comprising the steps of:

intercepting virtual addresses to a virtual cache or memory management unit;

determining whether the virtual addresses are aliased;

passing the virtual addresses to the virtual cache or memory management unit if virtual addresses are not aliased; and forming new virtual addresses from the intercepted virtual addresses and passing the new virtual addresses to the virtual cache or memory management unit if the virtual addresses are aliased.

2. The method described in claim 1, further comprising dividing the virtual cache or memory management unit into process slots corresponding to separate active processes.

3. The method described in claim 2, further comprising providing virtual address aliasing between the slots corresponding to the different active processes.

4. The method described in claim 3, further comprising aliasing the virtual addresses for a current one of the active processes.

5. The method described in claim 4, further comprising forming the new virtual addresses so that the virtual cache or memory management unit will be addressed without address aliasing for the current process.

6. The method described in claim 2, further comprising additionally locating a current one of the active processes in a current process slot in address space which is always assigned to the current process.

7. The method described in claim 6, wherein forming the new addresses comprises:

detecting virtual addresses directed to the current process slot; and modifying the addresses to generate the new addresses for the section of the virtual cache holding current one of the active processes.

8. The method described in claim 7, wherein modifying the virtual addresses comprises changing the high order bits of the virtual addresses to an address of the current one of the active processes.

9. A system including a virtual address dealiaser for supporting virtual address dealiasing in a system in which virtual addresses from one of a plurality of active process slots running on an operating system are de-aliased to a current process slot, the dealiaser comprising:

comparison logic that intercepts virtual addresses to a virtual cache or memory management unit and determines whether the virtual addresses are aliased;

selector logic that passes the virtual addresses to the virtual cache or memory management unit if the comparison logic determines that the virtual addresses are not aliased, and that forms new virtual addresses from the intercepted virtual addresses and passes the new virtual addresses to the cache or memory management unit if the virtual addresses are aliased.

10. The dealiaser described in claim 9, wherein the comparison logic determines whether the virtual addresses are for a section of address space that only holds a current process.

11. The dealiaser described in claim 10, wherein the selector logic generates the new virtual addresses corresponding to another section of the address space that also holds the current process when the comparison logic detects virtual addresses to the current process section.

12. The dealiaser described in claim 9, further comprising a current process register that stores a current one of the active processes.

13. The dealiaser described in claim 12, wherein the selector logic passes the contents of the current process register as high order bits of the new virtual addresses.

14. A method for supporting limited virtual address aliasing in a system in which virtual addresses from one of a plurality of active process slots running on an operating system are aliased to a current process slot, the method comprising the steps of:

intercepting virtual addresses to a virtual cache and memory management unit;

determining whether the virtual addresses are aliased;

passing the virtual addresses to the virtual cache and memory management unit if virtual addresses are not aliased; and forming new virtual addresses from the intercepted virtual addresses and passing the new virtual addresses to the virtual cache and memory management unit if the virtual addresses are aliased.

15. A system including a virtual address dealiaser for supporting virtual address dealiasing in a system in which virtual addresses from one of a plurality of active process slots running on an operating system are de-aliased to a current process slot, the dealiaser comprising:

comparison logic that intercepts virtual addresses to a virtual cache and memory management unit and determines whether the virtual addresses are aliased;

selector logic that passes the virtual addresses to the virtual cache and memory management unit if the comparison logic determines that the virtual addresses are not aliased, and that forms new virtual addresses from the intercepted virtual addresses and passes the new virtual addresses to the cache and memory management unit if the virtual addresses are aliased.

* * * * *